United States Patent
Nilsson et al.

(10) Patent No.: US 12,494,834 B2
(45) Date of Patent: Dec. 9, 2025

(54) ADVANCED ANTENNA SYSTEM ACTIVE IMPEDANCE LOAD MITIGATION

(71) Applicant: Telefonaktiebolaget LM Ericsson (publ), Stockholm (SE)

(72) Inventors: Magnus Nilsson, Lund (SE); Hans Hagberg, Limhamn (SE); Viktor Arfwedson, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/700,143

(22) PCT Filed: Oct. 21, 2022

(86) PCT No.: PCT/EP2022/079356
§ 371 (c)(1),
(2) Date: Apr. 10, 2024

(87) PCT Pub. No.: WO2023/072749
PCT Pub. Date: May 4, 2023

(65) Prior Publication Data
US 2024/0421880 A1 Dec. 19, 2024

Related U.S. Application Data

(60) Provisional application No. 63/271,910, filed on Oct. 26, 2021.

(51) Int. Cl.
*H04B 7/06* (2006.01)
*H01Q 1/24* (2006.01)
(Continued)

(52) U.S. Cl.
CPC ........... *H04B 7/0691* (2013.01); *H01Q 1/246* (2013.01); *H04B 1/0475* (2013.01); *H04B 1/40* (2013.01);
(Continued)

(58) Field of Classification Search
CPC ...... H04B 7/0691; H04B 1/0475; H04B 1/40; H04B 2001/0425; H04B 1/0458;
(Continued)

(56) References Cited

U.S. PATENT DOCUMENTS

| 6,922,102 B2 | 7/2005 | Myer et al. |
| 2016/0094190 A1* | 3/2016 | Young ..................... H03F 1/565 333/32 |

(Continued)

FOREIGN PATENT DOCUMENTS

| CN | 111740703 A | 10/2020 |
| WO | 2019223865 A1 | 11/2019 |

OTHER PUBLICATIONS

Berthier, A. et al., "Active VSWR Robustness Comparison for Different Phase Combining Topologies", 2021 19th IEEE International New Circuits and Systems Conference, 2021, Downloaded on Nov. 29, 2022 from IEEE Xplore, pp. 1-4, IEEE.

(Continued)

*Primary Examiner* — David S Huang
(74) *Attorney, Agent, or Firm* — COATS & BENNETT, PLLC

(57) ABSTRACT

In an Advanced Antenna System, a desired power amplifier, PA, load distribution, which counters the mismatch of active impedance load, is achieved by altering the lengths of routing traces connecting PA outputs and corresponding antenna elements/subarrays. The combined output performance in the beam during active impedance load is then restored to the matched condition performance. This can be visualized as distributing the load impedance more evenly—ideally, on a circle—on a Smith chart.

23 Claims, 13 Drawing Sheets

(51) Int. Cl.
*H01Q 3/34* (2006.01)
*H04B 1/04* (2006.01)
*H04B 1/40* (2015.01)

(52) U.S. Cl.
CPC ....... *H01Q 3/34* (2013.01); *H04B 2001/0425* (2013.01)

(58) Field of Classification Search
CPC ........ H01Q 1/246; H01Q 3/34; H01Q 15/246; H01Q 21/005
See application file for complete search history.

(56) References Cited

U.S. PATENT DOCUMENTS

| | | | |
|---|---|---|---|
| 2016/0142035 A1* | 5/2016 | De Foucauld | H03H 7/40 333/17.3 |
| 2019/0341960 A1 | 11/2019 | Pal et al. | |
| 2019/0372630 A1 | 12/2019 | Brunel et al. | |
| 2022/0006428 A1 | 1/2022 | Shepphard et al. | |
| 2022/0200541 A1 | 6/2022 | Sun et al. | |
| 2023/0006624 A1 | 1/2023 | Campbell | |

OTHER PUBLICATIONS

Frye, R. et al., "A 2GHz Quadrature Hybrid Implemented in CMOS Technology", IEEE 2002 Custom Integrated Circuits Conference, 2002, Downloaded on Nov. 8, 2022, pp. 287-290, IEEE.

Mannem, N. S., et al., "A Reconfigurable Hybrid Series/Parallel Doherty Power Amplifier With Antenna VSWR Resilient Performance for MIMO Arrays", IEEE Journal of Solid-State Circuits, vol. 55, No. 12, Dec. 2020, pp. 3335-3348, IEEE.

Berretta, G. et al., "A Balanced CDMA2000 SiGe GBT Load Insensitive Power Amplifier", 2006, Downloaded on Jun. 2, 2022 from IEEE Xplore, pp. 523-526, IEEE.

Gonçalves, C. et al., "Switch-Based Variable Length Stubs Network for PA Load Sensitivity Reduction", IEEE Access, Multidisciplinary; Rapid Review; Open Access Journal, vol. 7, Received Sep. 23, 2019, published Oct. 18, 2019, version of Oct. 31, 2019, pp. 152576-152584, IEEE.

* cited by examiner

| AZIMUTH | -60 | -30 | 0 | 30 |
|---|---|---|---|---|
| DEFAULT (EQUAL LENGTH) | 5.2% | 3.4% | 1.6% | 2.4% |
| WITH LENGTH MISMATCH | 1.9% | 1.6% | 1.3% | 1.6% |

ADVANCED ANTENNA SYSTEM ACTIVE IMPEDANCE LOAD MITIGATION

FIELD OF DISCLOSURE

The present disclosure relates generally to antenna arrays, and in particular to mitigation of active impedance load by varying amplifier-antenna element interconnect length, such as in Advanced Antenna Systems (AAS).

BACKGROUND

Wireless communication networks are ubiquitous in many parts of the world. These networks continue to grow in capacity and sophistication. To accommodate more users, different types of devices, and different use cases, the technical standards governing the operation of wireless communication networks continue to evolve. The fourth generation (4G) of network standards has been deployed, and the fifth generation (5G) is in development, and the sixth generation (6G) is in conceptual design. With each generation, technological advances improve the capacity and spectral efficiency of the wireless communication system. For example, 5G added new frequency bands, and applied beamforming. This trend is expected to continue in 6G by exploiting additional frequency bands, and applying more advanced beamforming.

5G added a second frequency range, FR2. This provided significant new available spectrum in the range 24.25-52.6 GHz. In this frequency range, beamforming is utilized to improve both coverage and capacity. Because the wavelengths are small at these high frequencies, antenna arrays with hundreds, or even thousands, of antenna elements are feasible.

The Advanced Antenna System (AAS) is a combination of AAS radio and AAS features. AAS radio refers to large antenna arrays of individual antenna elements, together with circuitry such as Phase Locked Loops (PLLs) that provide Radio Frequency (RF) signals with phase control, and RF drivers, including Power Amplifiers (PA). AAS Features refers to multi-antenna features, such as beamforming and Multiple Input, Multiple Output (MIMO) techniques, including spatial diversity and spatial multiplexing, that are executed in the AAS radio.

Spatial diversity refers to transmitting the same signal on different propagations paths (e.g., different transmit/receive antennas), which increases robustness against fading, co-channel interference, and other deleterious effects of RF signal transmission. Spatial multiplexing also uses multiple transmit and receive antennas, and refers to transmitting different portions of data on different propagation paths, using space-time coding, to increase data rates.

Beamforming refers to the use of antennas having increased and controllable directionality, whereby an RF transmission is narrow, and is "aimed" in a specific direction. This is enabled by transmitting or receiving signals with controlled relative phase and gain in the antenna elements (or subarrays of antenna elements). The relative phases of, e.g., transmit signals sent to each antenna element are controlled to create constructive or destructive interference, thus amplifying the signal in some directions, and attenuating it in others, and hence controlling the direction in which the beam is transmitted. Similar phase manipulation of signals from antenna elements (or subarrays) in a receive antenna can also result in beamforming the sensitivity of an antenna array in receiving signals. Also, multiple orthogonal beams can be formed and aimed in different directions, thus simultaneously addressing multiple wireless devices, also known as User Equipment (UE).

To form robust beams, antenna elements are normally placed tightly together. For example, a distance of $\lambda/2$ is commonly used (where $\lambda$ is the RF wavelength), to form arbitrary beams without folding. However, the tight antenna spacing causes high electromagnetic coupling between the antennas, and additionally signals leak in between the antennas. The beamsteering, combined with the antenna coupling, makes the impedance seen by each power amplifier (PA) driving the antenna elements (or subarrays) deviate from a designed impedance.

The PA is designed to have nominal load impedance for correct output power, linearity, and efficiency. The PA amplifies and delivers electrical power to the antenna element/subarray, which converts it to an electromagnetic signal. However, if the PA impedance load diverges from its designed (optimum) value, there is an impedance mismatch, which degrades PA performance.

To direct a beam to a desired direction, a phase shift is required between the antenna elements (or subarrays). The same signal is present at all antenna elements, and electromagnetic energy of the signal leaks between them. This can be seen by the PAs as a reflection, or mismatch in impedance, which is not present when no phase shifts are introduced to steer the beam. Accordingly, the designed impedance seen by the PA is referred to as the impedance in the boresight direction (i.e., where the RF signal is radiated normal to the plane of the antenna element). When coupling is present between the antenna elements (due to spacing), and the same signal is sent on all antennas, but with different phases, this is experienced by the PA as an impedance mismatch, even though it originates from leakage between antenna elements. This mismatch is referred to herein as "active impedance load." Because the active impedance load causes a partial reflection of the RF signal from the antenna element (or subarray) back toward the PA, a standing wave is generated along the transmission line connecting the two. This is quantified in the art as an antenna impedance voltage standing wave ratio (VSWR), which is calculated in terms of the reflection coefficient or return loss (also known as the s11 parameter). Assuming the antenna and PA are impedance-matched for signals transmitted in the boresight direction, the active impedance load, or VSWR, typically grows higher as the beam-angle increases, since the relative phase shift in between antenna elements (or subarrays) increases.

At low frequencies, an isolator can be inserted in between a PA and its antenna element/subarray, to ensure that the active impedance load is not transferred to the PA. In high frequency AAS, there is no room to fit an isolator at each PA output.

The PA typically is impedance matched in the boresight direction to optimize efficiency. Also, the PA is operated close to its compression point to maximize efficiency. These properties make both PA output power and linearity vary due to the active impedance load.

A particularly problematic use case is when the PA efficiency is boosted by adding closed-loop Digital Pre-Distortion (DPD). The PA is operated more non-linearly, and the DPD corrects the linearity, which boosts overall power efficiency. However, this arrangement makes the system even more sensitive to active impedance load. The beam is switched very fast in AAS systems, and the DPD cannot adapt to the fast beam switching rate. In many cases, DPD power consumption is considered high, and the DPD is shared among several PAs. The DPD thus sees the average active impedance load from several PAs. In general, this is beneficial, since beam performance is the average of all PAs used to form the beam.

An AAS base station normally has a wider azimuth service area than elevation service area. Typical numbers for a 3-sector base station are 120 degrees azimuth service area, and 20-30 degrees elevation service area. This enables combining two or more elevation antenna elements to form a larger antenna array and increase the Effective Isotropic Radiated Power (EIRP), while maintaining the same number of PAs, and hence the same power consumption. In this case, the antenna coupling in azimuth direction dominates, and the active impedance load is primarily dependent on azimuth beamsteering.

In AAS, Multi-User (MU)-MIMO is used to simultaneously address multiple users, either by spatial multiplexing or by frequency domain multiplexing. To utilize the full antenna array, this requires digital access to all PAs. However, this conflicts with the idea of DPD sharing across multiple PAs, which requires the same data to be sent to each PA. A compromise is to share DPD across several elevation elements, and thus only limit the MU-MIMO combinations to one elevation plane.

Combining antenna elements/subarrays in the elevation direction, while using one DPD for several elevation antenna elements/subarrays, makes the DPD averaging effect disappear, since each of the combined PAs sees almost the same active antenna load.

The Background section of this document is provided to place aspects of the present disclosure in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of aspects of the disclosure or to delineate the scope of the disclosure. The sole purpose of this summary is to present some concepts disclosed herein in a simplified form as a prelude to the more detailed description that is presented later.

According to one or more aspects of the present disclosure described and claimed herein, a desired PA load distribution, which counters the mismatch of active impedance load, is achieved by altering the electrical length of interconnect between PA outputs and corresponding antenna elements/subarrays. In some aspect, this electrical length mismatch is achieved by altering the lengths of routing traces (e.g., on a Printed Circuit Board, or PCB) connecting PA outputs and corresponding antenna elements/subarrays. The combined output performance in the beam during active impedance load is then restored to the matched condition performance. This can be visualized as distributing the load impedance more evenly—ideally, on a circle—on a Smith chart, which is an analytic tool known to those of skill in the RF arts for visualizing antenna system impedance as a function of frequency.

One aspect relates to an antenna system. The antenna system includes an antenna array comprising a plurality of antenna elements, wherein one or more antenna elements are combined into an antenna element subarray; and a radio transceiver having a plurality of RF tiles, each connected to an antenna element subarray, wherein each tile comprises a power amplifier (PA) and low noise amplifier (LNA). Each RF tile within a group of RF tiles connects to a corresponding antenna element subarray within a corresponding group of antenna element subarrays, and wherein each such connection within a group presents a different impedance to the respective PA. The different impedances mitigate active impedance load caused by beamsteering RF signals transmitted by the antenna array.

Another aspect relates to a base station operative in a wireless communication network. The base station includes processing circuitry configured to implement communications according to one or more technical standards; communication circuitry operatively connected to the processing circuitry and configured to implement beamsteering to wirelessly communicate with other network nodes; and an antenna array operatively connected to the communication circuitry. The communication circuitry and antenna array form the antenna system described above.

Still another aspect relates to a method of transmitting or receiving Radio Frequency (RF) signals in a wireless communication network using antenna system comprising an antenna array comprising a plurality of antenna elements, wherein one or more antenna elements are combined into an antenna element subarray, and a radio transceiver having a plurality of RF tiles, each connected to an antenna element subarray, wherein each tile comprises a power amplifier (PA) and low noise amplifier (LNA). The method is characterized by mitigating active impedance load caused by beamsteering RF signals transmitted by the antenna array. The antenna array is operated with each RF tile within a group of RF tiles connected to a corresponding antenna element subarray within a corresponding group of antenna element subarrays. A different impedance is presented to the respective PA for each such connection within a group.

BRIEF DESCRIPTION OF THE DRAWINGS

The present disclosure will now be described more fully hereinafter with reference to the accompanying drawings, in which aspects of the disclosure are shown. However, this disclosure should not be construed as limited to the aspects set forth herein. Rather, these aspects are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to an exemplary aspect thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

Figure 1:
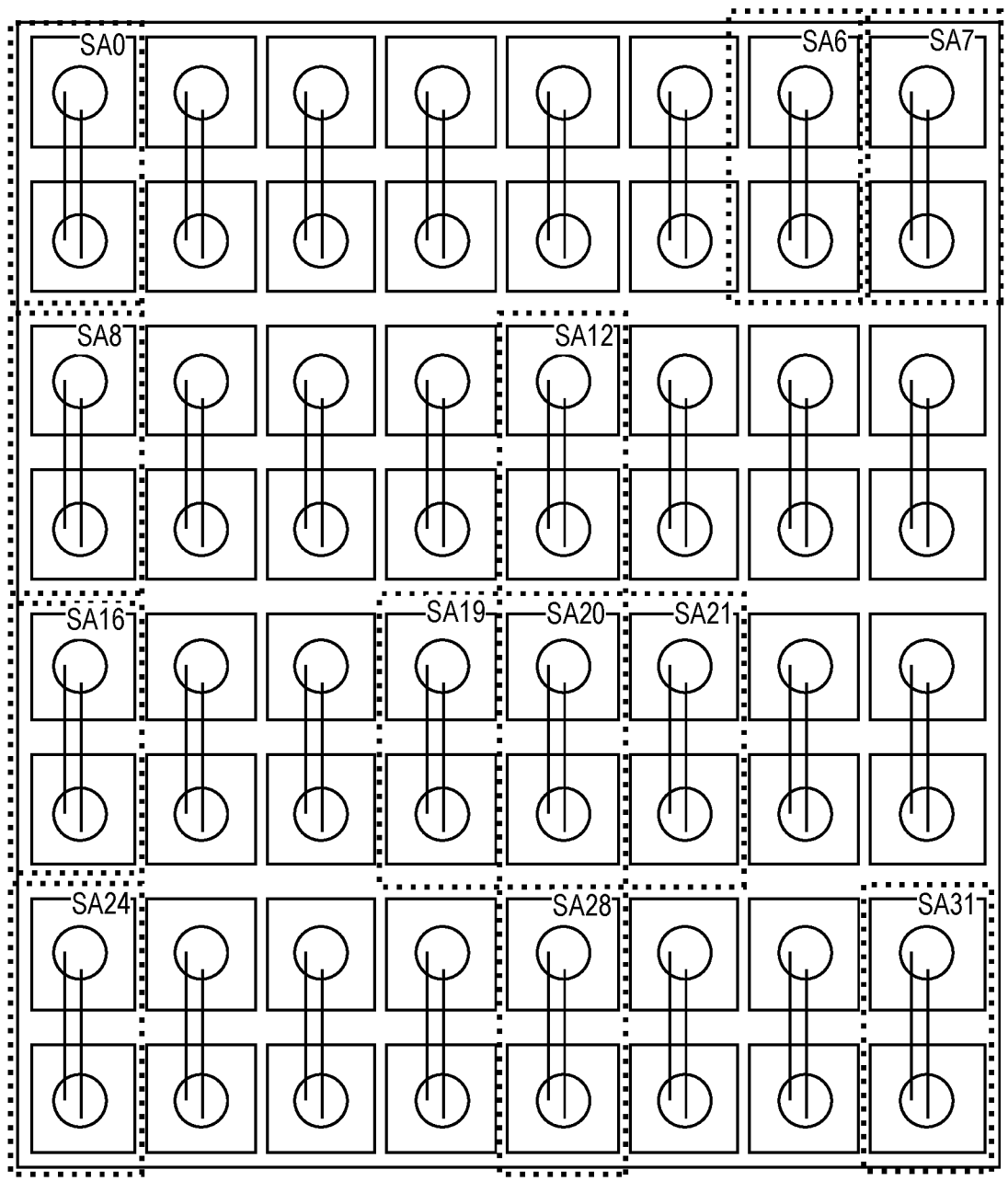
FIG. 1 depicts an exemplary array of 64 antenna elements, wired into 32 2×1 subarrays.

FIG. 1 depicts an example antenna array according to aspects disclosed herein. In this example, the array consists of 8×8 dual-polarized antenna elements. The antenna elements are pairwise interconnected to form 2×1 subarrays, and thus reduce number of active radio chains required to connect to the antenna and apply beamforming. The subarrays are numbered SA0 to SA31 (moving left to right and top to bottom). In general, antenna elements of an array may be grouped into any number of subarrays, each comprising any number of individual antenna elements. Subarrays in an antenna array need not be the same—that is, some antennal elements may be grouped into one or more m×n subarrays, and other antennal elements may be grouped into one or more i×j subarrays, where m≠i and/or n≠j. As used herein, a subarray may include from one antenna element up to all of the antenna elements in an antenna array.

Figure 2:
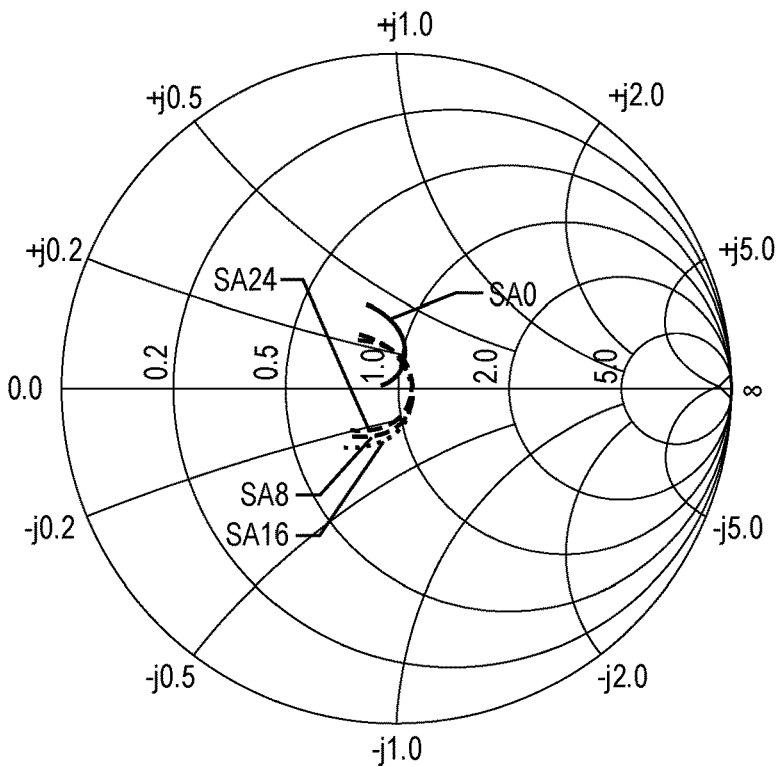
FIG. 2 depicts two Smith charts, each showing the impedance response of four subarrays in a column as an antenna beam azimuth direction is changed.
Figure 2:
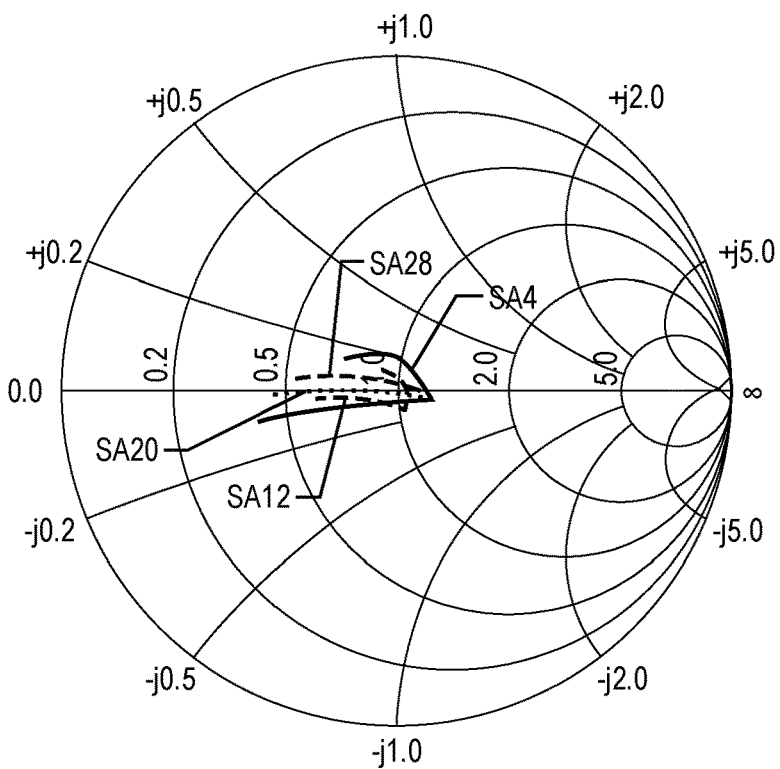

FIG. 2 depicts Smith chart plots of active impedance when sweeping signals transmitted or received by the antenna array of FIG. 1, in the azimuth direction, from −60 degrees to +60 degrees, at a single frequency. In particular, the upper graph plots the responses of the four antenna subarrays for column 1 (SA0, SA8, SA16, and SA24), and the lower graph plots the responses of the four antenna subarrays for column 5 (SA4, SA12, SA20, and SA28). Plots of antenna subarrays in the other columns are similar, i.e., generally convex or generally flat. In all cases, the impedance varies similarly between the subarrays in the same column.

Figure 3:
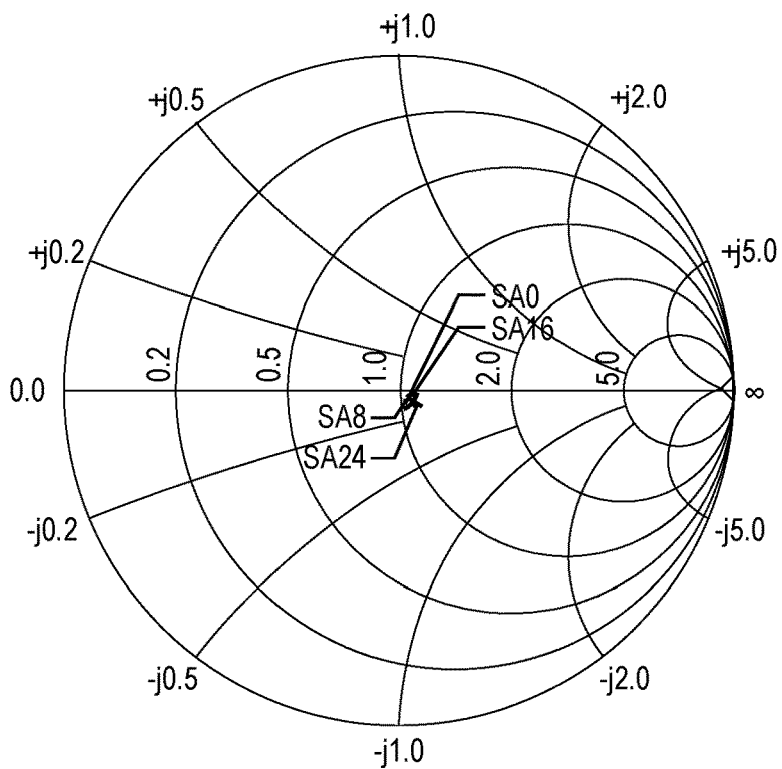
FIG. 3 depicts two Smith charts, each showing the impedance response of four subarrays in a column as an antenna beam elevation direction is changed.
Figure 3:
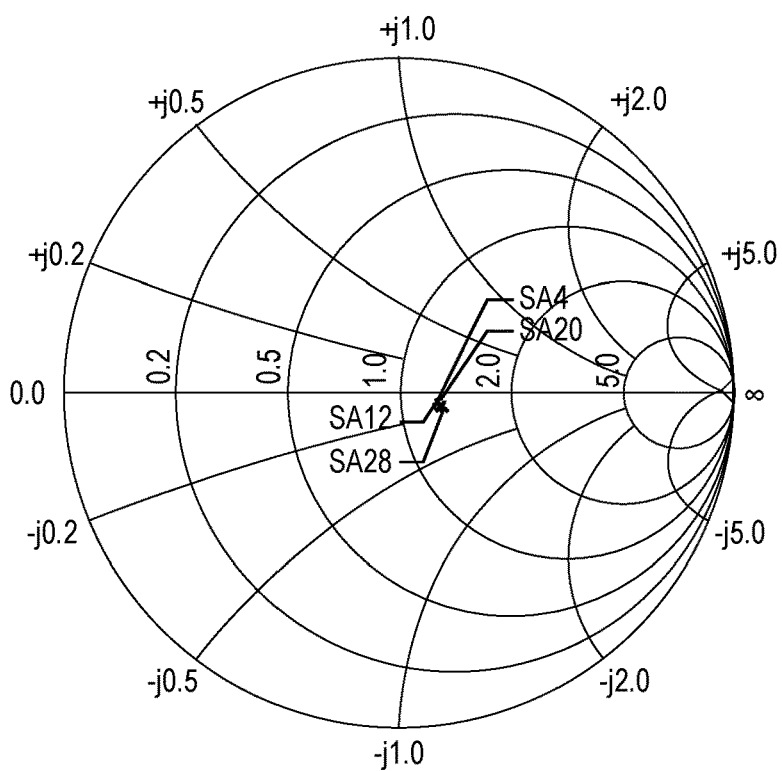

FIG. 3 depicts Smith chart plots of active impedance when sweeping signals transmitted or received by the antenna array of FIG. 1, in the elevation direction, from −15 degrees to +15 degrees, at a single frequency. In particular, the upper graph plots the responses of the four antenna subarrays for column 1 (SA0, SA8, SA16, and SA24), and the lower graph plots the responses of the four antenna subarrays for column 5 (SA4, SA12, SA20, and SA28). Plots of antenna subarrays in the other columns are similar. It can be seen that there is little active impedance load in this case.

From FIGS. 2 and 3, it is apparent that the active impedance load is dominated by azimuth beamsteering, and there is not much variation due to elevation beamsteering. Thus, in most conditions there is a high correlation between the antenna loads.

Figure 4:
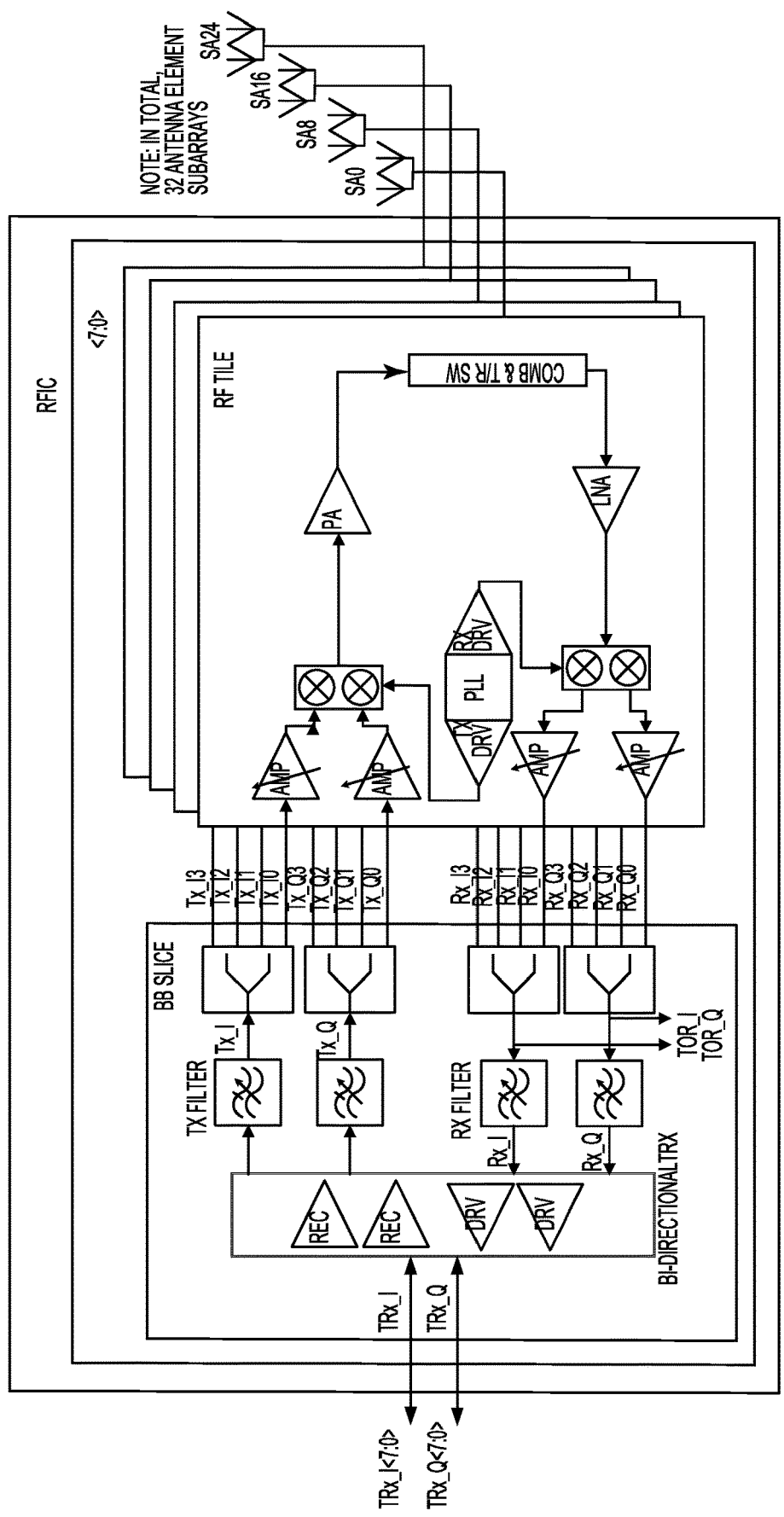
FIG. 4 is a hardware block diagram of a Radio Frequency Integrated Circuit (RFIC) transceiver for connection to 32 subarrays of antenna elements.

FIG. 4 depicts relevant portions of a Radio Frequency Integrated Circuit (RFIC) according to one aspect. This RFIC has 8 bidirectional IQ baseband ports, an internal port expansion by four, and thus 32 antenna connections. Each antenna branch, also referred to as an RF tile, has its own PLL, to enable beamforming by controlling the relative phase between antenna elements or subarrays. In transmit mode, the IQ baseband signal is split to four branches, upconverted to RF using an IQ-modulator, and amplified by a PA. An antenna switch connects either the transmitter or the receiver branch to the antenna element subarray. As depicted in FIG. 4, the tile connects to the antenna element subarrays in column 1 of the antenna system depicted in FIG. 1 (that is, subarrays SA0, SA8, SA16, and SA24). In receive mode, each antenna element subarray signal is amplified by the LNA, downconverted to baseband, and added to the other three branches sharing the IQ-interface. The receiver can also be reused as a transmit observation receiver (TOR), to sense the PA output signal, for use in closed-loop DPD operation (alternatively, the RFIC may include separate TOR circuitry).

The transceiver of FIG. 4 can be used together with the exemplary antenna array of FIG. 1. The four RF tiles sharing a baseband IQ-interface are here each connected to antenna element subarrays in one column of the antenna array. For example, the antenna connections depicted in FIG. 4 may connect to the antenna element subarrays of column 1 (SA0, SA8, SA16, and SA24).

Figure 5:
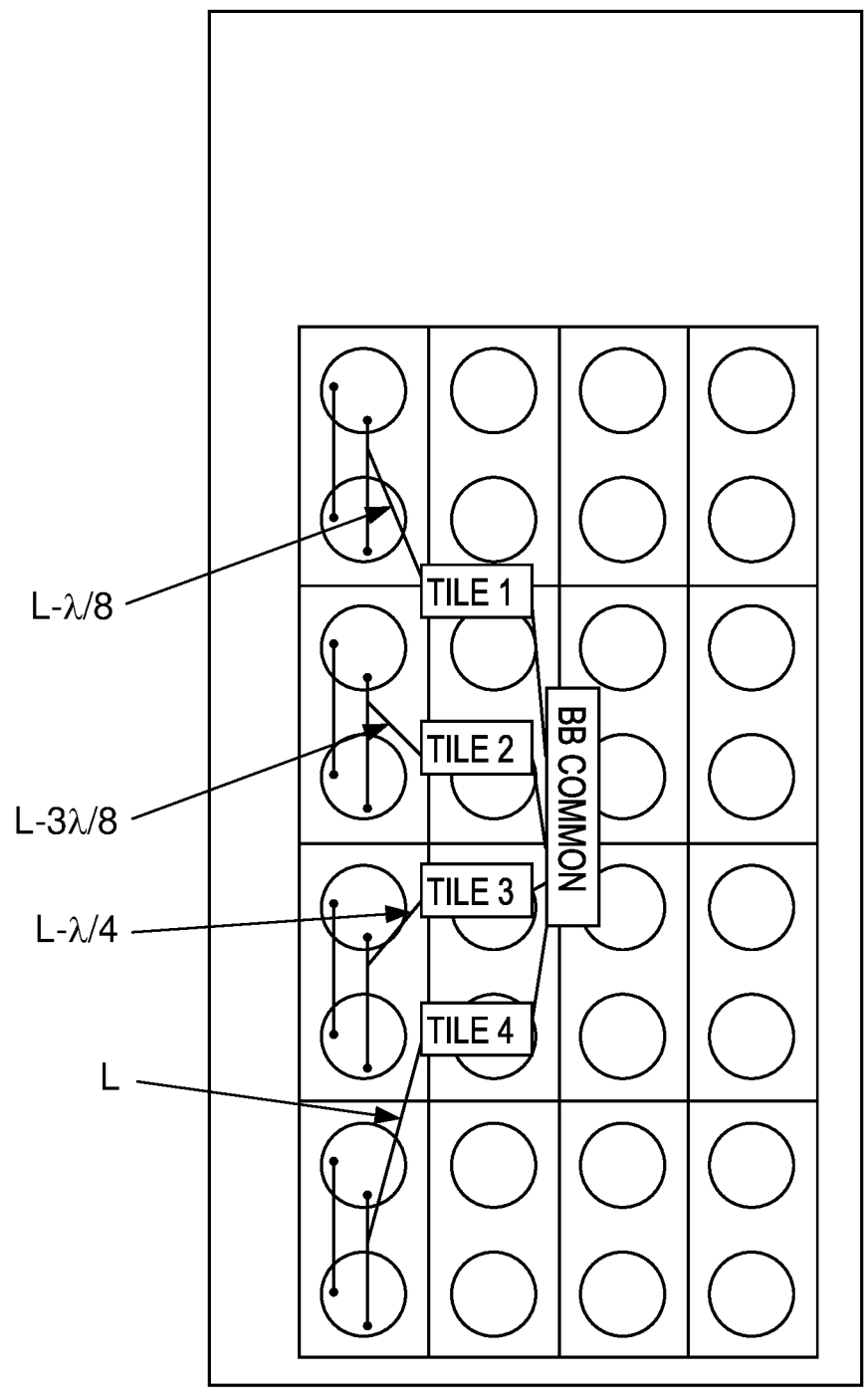
FIG. 5 shows the connections of a group of four PA outputs to a corresponding group of four antenna element subarrays, each connection having a different interconnect routing length.

FIG. 5 shows the interconnect between one column of four antenna element subarrays and corresponding RF tiles according to one aspect of the present disclosure. Only one polarization is shown, for readability. There is a deliberate length difference applied in the routing lengths, to achieve the desired PA load impedance shifts. When using a common DPD for four PAs, the relative electrical length difference between each pair of routing traces should be $\lambda/8$, to enable a 90 degree shift between the four PA load impedances, where $\lambda$ is the wavelength of the RF signal. The physical length difference to apply is the electrical length downscaled by sqrt(epsilon), where epsilon is the dielectric constant of the Printed Circuit Board (PCB) material (normally 3-4). This makes the signal travel slower in the PCB and thus the wavelength is shortened. In the example depicted, the four routing lengths are L, L-$\lambda/4$, L-$3\lambda/8$, and L-$\lambda/8$. More generally, in one aspect, for a group of N PAs and antenna element subarrays (N≥2), the routing length difference should be a multiple of $\lambda/(2N)$, each generating a relative impedance phase shift of 360/N degrees. Note that the physical routing length differences must be compensated in the transceiver (e.g., in the PLL in the aspect of FIG. 4), to achieve the same beam direction.

Altering the length of routing traces in the PCB, as described above and as shown in FIG. 5, is one way to alter the electrical length of the interconnect between the PA output and the antenna element or subarray. The electrical length may additionally or alternatively be altered by adjustments to components such as the antenna switch, interposing a transmission line, or the like. Such electrical length alternations must also be compensated in the transceiver.

Figure 6:
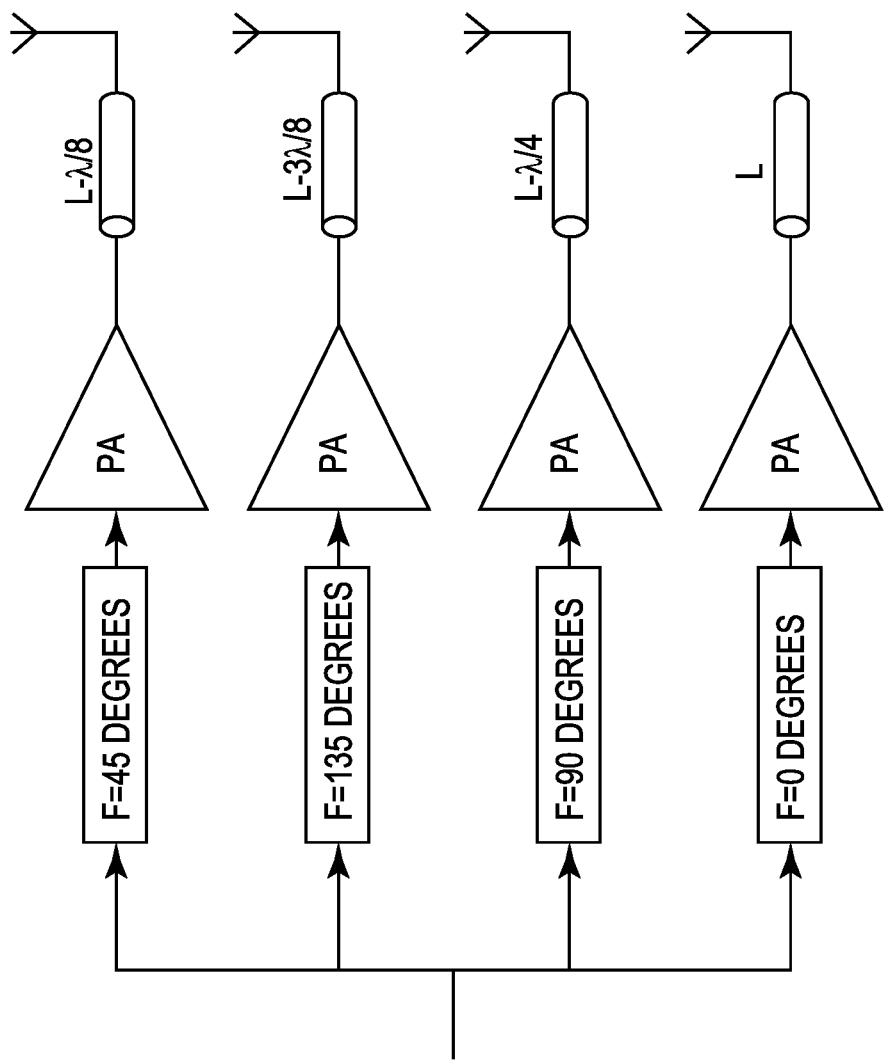
FIG. 6 depicts the interconnect routing length differences and corresponding phase compensation.

FIG. 6 depicts the routing mismatch and corresponding phase compensation. The phase compensation can be part of normal beamsteering phase shifting.

Figure 7:
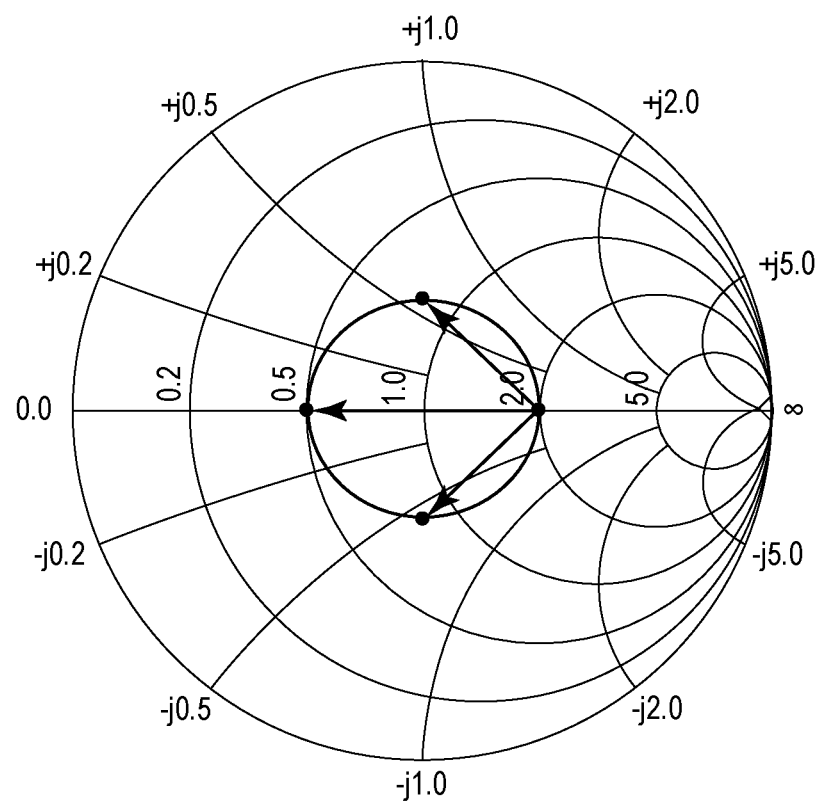
FIG. 7 is a Smith plot of the impedance translation caused by routing length differences.

FIG. 7 visualizes the impedance translation by the introduced routing length difference on a Smith chart. Assume, for this example, that the routing length was initially L to all four PAs—this results in a load impedance experienced by the PA corresponding to the right-most dot. Reducing the routing length for three of these paths, e.g., according to FIGS. 5 and 6, results in an impedance shift for three of the PAs, and the impedance is evenly distributed across the Smith chart. Those of skill in the art will readily appreciate that differences in the routing lengths may also be achieved by increasing the length of three of the paths, or increasing some and decreasing others, or creating routes where none of the routing lengths are equal to L, so long as they maintain the relative routing length differences described above.

Figure 8:
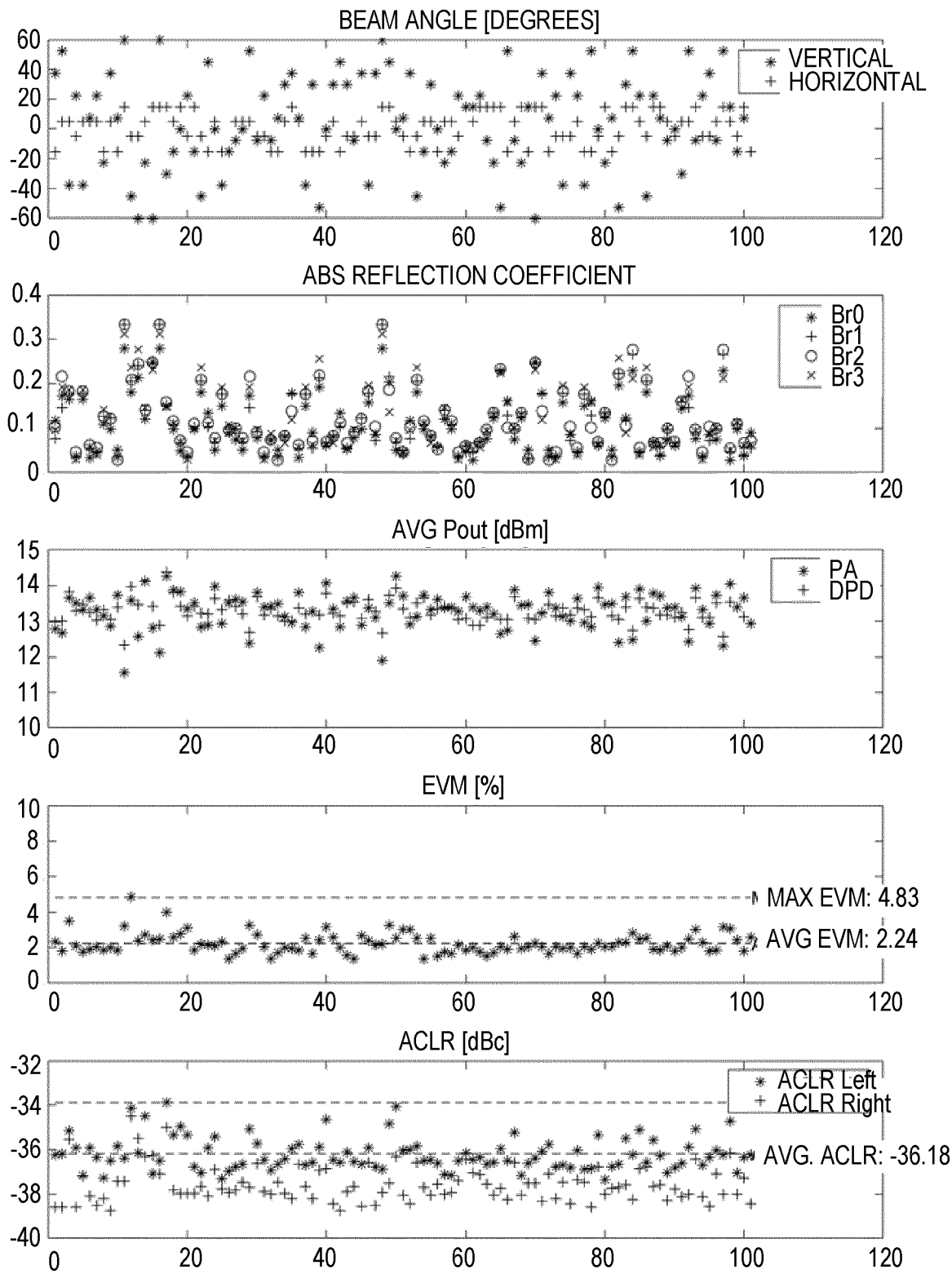
FIG. 8 shows five plots of antenna beam performance metrics according to the prior art, constant-length interconnect routing.

FIG. 8 depicts antenna performance metrics using constant routing length—that is, prior to applying the inventive routing length differences—while varying the beamsteering direction randomly. The result presented is the in-beam sum of four PAs controlled by a shared DPD. The uppermost plot shows random iterations of azimuth and elevation beamsteering. The next plot shows the corresponding magnitude of reflection coefficient at the antenna. The third plot shows the average in-beam output power $P_{out}$. The fourth plot shows in-beam Error Vector Magnitude (EVM), and the lowest plot shows left and right Adjacent Channel Leakage Ratio (ACLR). As these plots show, output power, EVM and ACLR vary widely over beam direction.

Figure 9:
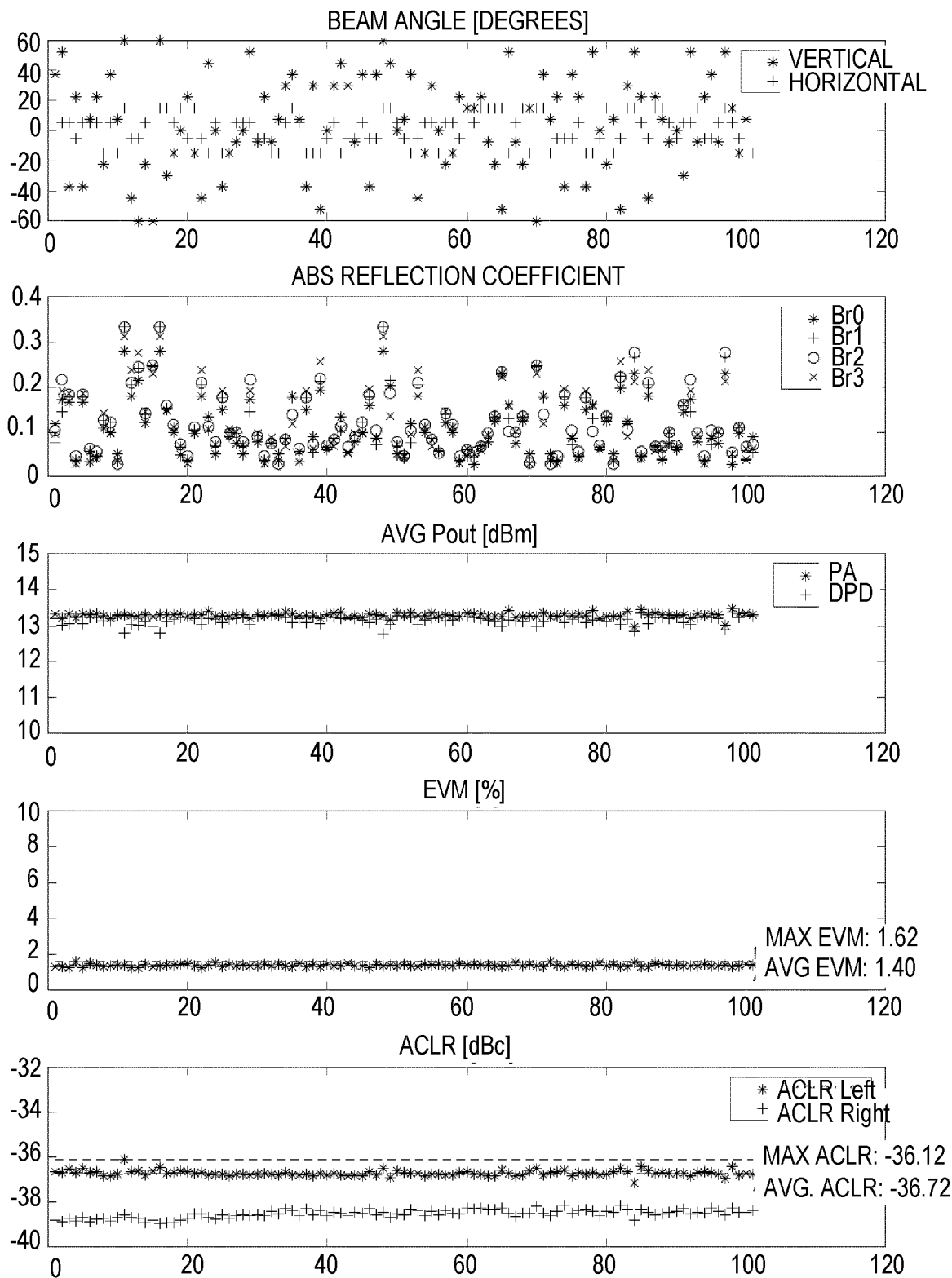
FIG. 9 shows five plots of antenna beam performance metrics according to aspects of the present disclosure, using different-length interconnect routing.

FIG. 9 presents the same plots, with the routing length difference according to aspects of the present disclosure, as the beamsteering direction was changed randomly. It is apparent that output power, EVM, and ACLR values are much more controlled over different beam directions. Note that each single PA still experiences an impedance mismatch, and has performance similar to FIG. 8. However, the sum of the four PAs exhibits improved in-beam performance.

In one aspect, further randomization is achieved by using different starting lengths L for different columns of the antenna array. This makes the column distortion more uncorrelated, which further improves in-beam EVM and ACLR for the full array.

Figure 10:
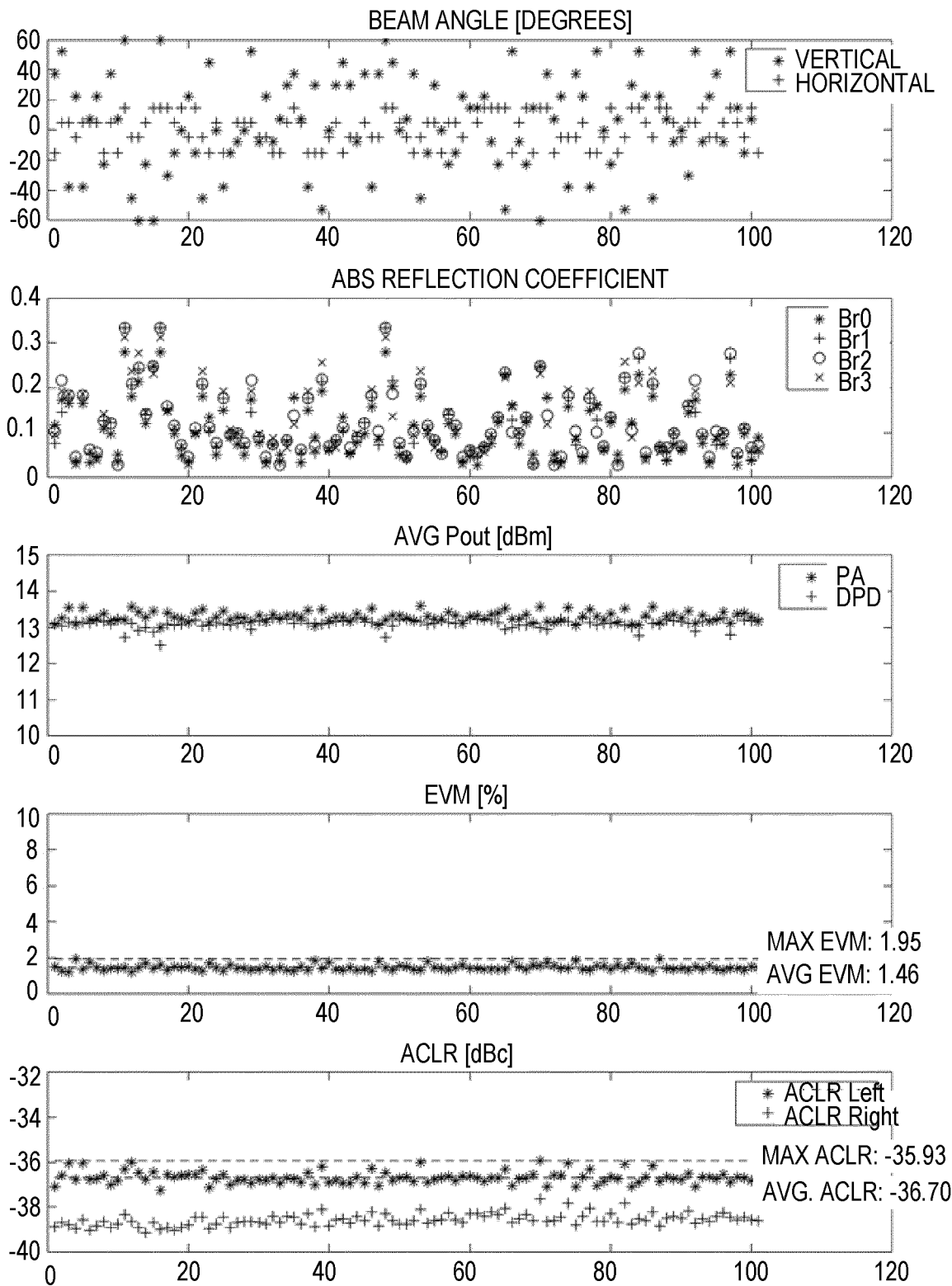
FIG. 10 shows five plots of antenna beam performance metrics according to aspects of the present disclosure, using different-length interconnect routing, with the center frequency shifted ~10%.

The routing length difference applies for a specific frequency. For a wideband system, the cancellation may be less efficient. However, for a fractional BandWidth (BW) <20%, the performance degradation is very small. This is visualized in FIG. 10, in which the center frequency was shifted ~10%. The $P_{out}$, EVM, and ACLR values still show significant improvement over the prior art plots of FIG. 8.

Figures 11, 12:
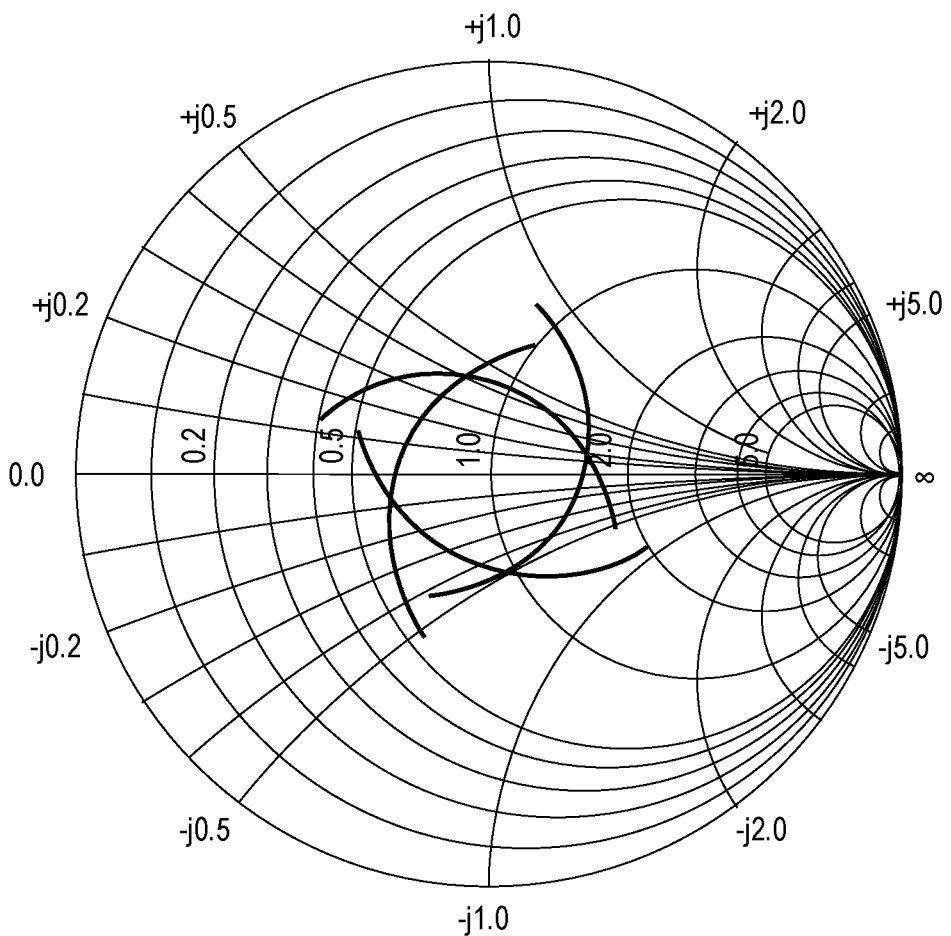
FIG. 11 is a Smith chart plot of impedance for different-length interconnect routing for a wideband signal.
FIG. 12 is a table listing metrics of the signal of FIG. 11.

When transmitting a wide bandwidth signal, the inductive load seen by the PA will vary significantly, as depicted in FIG. 11. The inductances are shown for four PAs with interconnect trace length mismatch. The impedance is still spread roughly equally in the Smith chart. The corresponding EVM numbers, with and without length mismatch applied, are shown in FIG. 12.

One potential issue is beam squinting, which occurs if the applied routing length difference is compensated by a phase shift. This could impair the beamforming if the fractional BW is high. If so, the applied length difference can be compensated by a routing length difference before the PA and after the LNA, instead of a phase shift.

Figure 13:
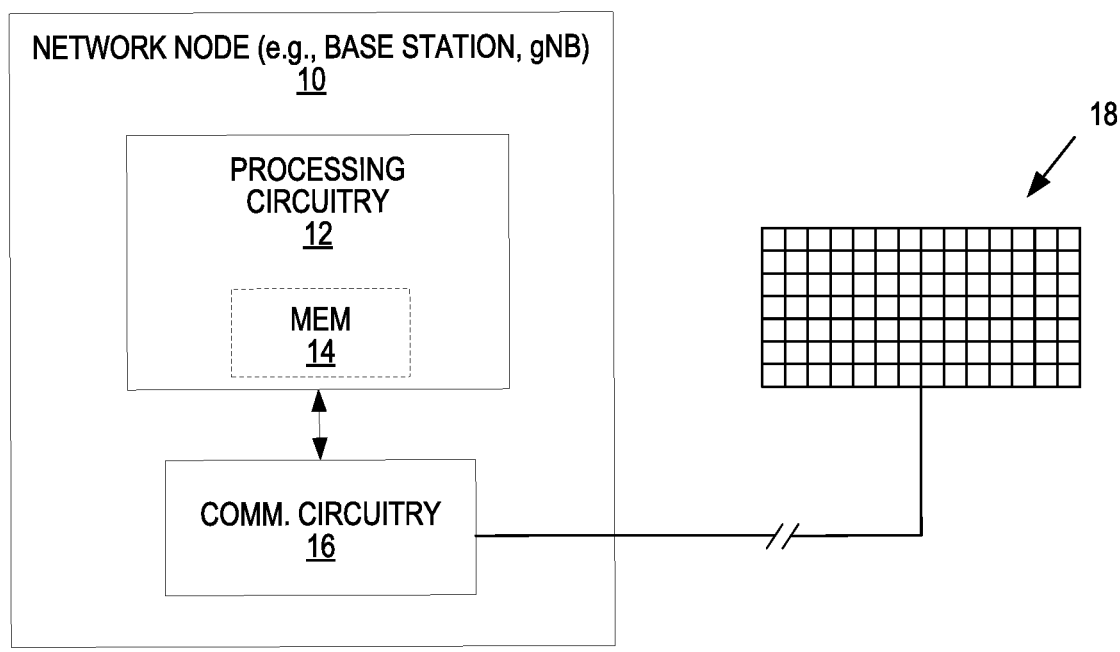
FIG. 13 is a hardware block diagram of a base station having an antenna array, such as that shown in FIG. 1, and described herein.

FIG. 13 illustrates a hardware block diagram of a network node 10 operative in a wireless communication network. The network node 10 implements base station functionality, e.g., a gNB in New Radio (NR), the Radio Access Technology (RAT) of 5$^{th}$ Generation (5G) wireless communication networks being developed by the Third Generation Partnership Project (3GPP). As shown, the base station 10 includes processing circuitry 12 and communication circuitry 16. The communication circuitry 16 is configured to transmit and/or receive information to and/or from one or more wireless devices, also known as User Equipment (UE) and/or other network nodes, e.g., via any communication technology. The communication circuitry 16 communicates with the UEs wirelessly via an antenna array 18, such as an AAS. As indicated by the broken line, the antenna array 18 may be located remotely from the base station 10, such as on a tower or building. The AAS 18 implements beamsteering, and features active induction load mitigation as described herein, such as by varying the length of interconnect routing between PAs and antenna element subarrays.

Figure 14:
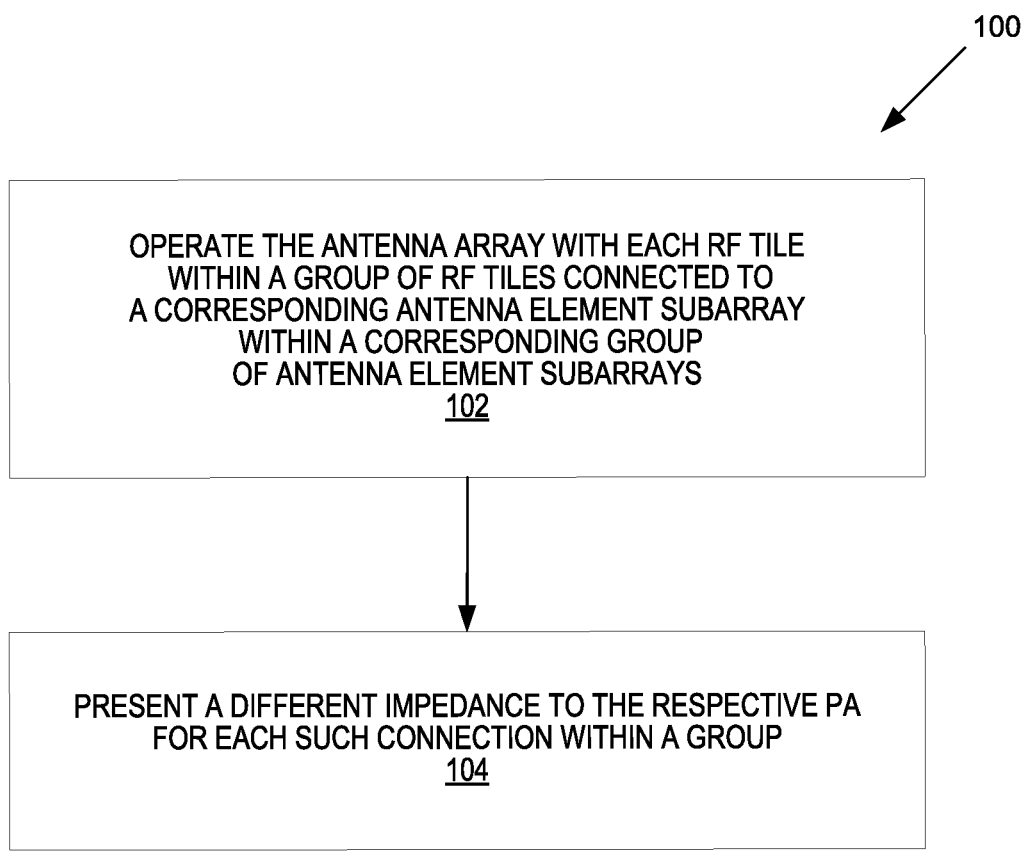
FIG. 14 is a flow diagram of steps in a method 100 of transmitting or receiving RF signals in a wireless communication network using an antenna system.

FIG. 14 illustrates steps in a method 100 of transmitting or receiving Radio Frequency (RF) signals in a wireless communication network using an antenna system. The antenna system comprises an antenna array, comprising a plurality of antenna elements, wherein one or more antenna elements are combined into an antenna element subarray. The antenna system further comprises a radio transceiver having a plurality of RF tiles. Each RF tile is connected to an antenna element subarray, wherein each tile comprises a power amplifier (PA), and low noise amplifier (LNA). The method mitigates active impedance load caused by beamsteering RF signals transmitted by the antenna array. The antenna array is operated with each RF tile within a group of RF tiles connected to a corresponding antenna element subarray within a corresponding group of antenna element subarrays (block 102). A different impedance is presented to the respective PA for each such connection within a group (block 104).

Aspects of the present disclosure have been presented in the context of a load impedance shift being generated by having different routing lengths between a PA and antenna element/subarray. However, aspects of the disclosure are not limited to this implementation. For example, the load impedance could be shifted by other means, such as using lumped reactive components.

Aspects of the present disclosure present numerous advantages over the prior art. Aspects disclosed herein enable the use of more non-linear PAs and DPD in an AAS, without the use of isolators. System efficiency is improved, and performance degradation due to active impedance load is minimized.

Although apparatuses described herein may include the illustrated combination of hardware components, other aspects may comprise computing devices with different combinations of components. It is to be understood that these computing devices may comprise any suitable combination of hardware and/or software needed to perform the tasks, features, functions, and methods disclosed herein. Moreover, while components are depicted as single boxes located within a larger box, or nested within multiple boxes, in practice, computing devices may comprise multiple different physical components that make up a single illustrated component, and functionality may be partitioned between separate components.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the aspects disclosed herein may be applied to any other aspect, wherever appropriate. Likewise, any advantage of any of the aspects may apply to any other aspects, and vice versa. Other objectives, features and advantages of the enclosed aspects will be apparent from the description.

The term "unit" may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

As used herein, the term "configured to" means set up, organized, adapted, or arranged to operate in a particular way; the term is synonymous with "designed to."

Some of the aspects contemplated herein are described more fully with reference to the accompanying drawings. Other aspects, however, are contained within the scope of the subject matter disclosed herein. The disclosed subject matter should not be construed as limited to only the aspects set forth herein; rather, these aspects are provided by way of example to convey the scope of the subject matter to those skilled in the art.

The present disclosure may, of course, be carried out in other ways than those specifically set forth herein without departing from essential characteristics of the disclosure. The present aspects are to be considered in all respects as illustrative and not restrictive, and all changes coming within the meaning and equivalency range of the appended aspects are intended to be embraced therein.

The invention claimed is:

1. An antenna system, comprising:
    an antenna array comprising a plurality of antenna elements, wherein one or more antenna elements are combined into an antenna element subarray; and
    a radio transceiver having a plurality of RF tiles, each connected to an antenna element subarray, wherein each tile comprises a power amplifier (PA) and low noise amplifier (LNA);
    wherein each RF tile within a group of RF tiles connects to a corresponding antenna element subarray within a corresponding group of antenna element subarrays, and wherein each such connection within a group presents a different impedance to the respective PA;
    whereby the different impedances mitigate active impedance load caused by beamsteering RF signals transmitted by the antenna array.

2. The antenna system of claim 1 wherein the different impedances of connections in each group arise from different lengths of routing traces connecting each RF tile to each corresponding antenna element subarray.

3. The antenna system of claim 2 wherein an electrical length of each routing trace in a group differs by a fraction of the signal wavelength at a characteristic frequency.

4. The antenna system of claim 2 wherein a group comprises N (N≥2), and wherein the routing lengths differ by a factor of $\lambda/(2N)$, each yielding a 360/N degree phase shift in impedances presented by the routing traces.

5. The antenna system of claim 2 wherein a common Digital Pre-Distortion (DPD) is shared among the PAs in a group, for which the corresponding antenna element subarrays are arranged in the elevation direction.

6. The antenna system of claim 5 wherein a different starting routing trace length is used for each group of antenna element subarrays arranged in the elevation direction.

7. The antenna system of claim 1 wherein each group of antenna element subarrays are arranged in the elevation direction.

8. The antenna system of claim 1 wherein the different impedances of connections in each group arise from different values of lumped reactive components connected to the antenna element subarrays.

9. The antenna system of claim 1 wherein phase shifts applied to effect beamsteering are adjusted to account for the different impedances, while maintaining the beam direction.

10. The antenna system of claim 9 wherein routing length differences are further applied upstream of the PA and/or downstream of the LNA to mitigate beam squinting.

11. The antenna system of claim 10 wherein the RF tiles share a common baseband signal.

12. A base station operative in a wireless communication network, comprising:
    processing circuitry configured to implement communications according to one or more technical standards;
    communication circuitry operatively connected to the processing circuitry and configured to implement beamsteering to wirelessly communicate with other network nodes, comprising:
        an antenna array comprising a plurality of antenna elements, wherein one or more antenna elements are combined into an antenna element subarray; and
        a radio transceiver having a plurality of RF tiles, each connected to an antenna element subarray, wherein each tile comprises a power amplifier (PA) and low noise amplifier (LNA);
        wherein each RF tile within a group of RF tiles connects to a corresponding antenna element subarray within a corresponding group of antenna element subarrays, and wherein each such connection within a group presents a different impedance to the respective PA;
        whereby the different impedances mitigate active impedance load caused by beamsteering RF signals transmitted by the antenna array.

13. A method of transmitting or receiving Radio Frequency, RF, signals in a wireless communication network using an antenna system comprising an antenna array comprising a plurality of antenna elements, wherein one or more antenna elements are combined into an antenna element subarray, and a radio transceiver having a plurality of RF tiles, each connected to an antenna element subarray, wherein each tile comprises a power amplifier (PA) and low noise amplifier (LNA) characterized by mitigating active impedance load caused by beamsteering RF signals transmitted by the antenna array by:
    operating the antenna array with each RF tile within a group of RF tiles connected to a corresponding antenna element subarray within a corresponding group of antenna element subarrays; and
    presenting a different impedance to the respective PA for each such connection within a group.

14. The method of claim 13 wherein the different impedances of connections in each group arise from different lengths of routing traces connecting each RF tile to each corresponding antenna element subarray.

15. The method of claim 14 wherein an electrical length of each routing trace in a group differs by a fraction of the signal wavelength at a characteristic frequency.

16. The method of claim 14 wherein a group comprises N (N≥2), and wherein the routing lengths differ by a factor of $\lambda/(2N)$, each yielding a $360/N$ degree phase shift in impedances presented by the routing traces.

17. The method of claim 13 wherein each group of antenna element subarrays are arranged in the elevation direction.

18. The method of claim 14 further comprising sharing a common Digital Pre-Distortion (DPD) among the PAs in a group, for which the corresponding antenna element subarrays are arranged in the elevation direction.

19. The method of claim 18 further comprising using a different starting routing trace length for each group of antenna element subarrays arranged in the elevation direction.

20. The method of claim 13 wherein the different impedances of connections in each group arise from different values of lumped reactive components connected to the antenna element subarrays.

21. The method of claim 13 further comprising adjusting phase shifts applied to effect beamsteering to account for the different impedances, while maintaining the beam direction.

22. The method of claim 21 further comprising using different routing length upstream of the PA and/or downstream of the LNA to mitigate beam squinting.

23. The method of claim 13 further comprising sharing a common baseband signal among the RF tiles.

\* \* \* \* \*